(12) United States Patent
Campos et al.

(10) Patent No.: US 9,475,142 B2
(45) Date of Patent: Oct. 25, 2016

(54) FIXED ABRASIVE SAWING WIRE WITH CUBO-OCTAHEDRAL DIAMOND PARTICLES

(71) Applicant: NV BEKAERT SA, Zwevegem (BE)

(72) Inventors: Glauber Campos, Belo Horizonte (BR); José Spinnewyn, Antwerp (BE)

(73) Assignee: NV BEKAERT SA, Zwevegem (BE)

( * ) Notice: Subject to any disclaimer, the term of this patent is extended or adjusted under 35 U.S.C. 154(b) by 118 days.

(21) Appl. No.: 14/412,579

(22) PCT Filed: Jul. 4, 2013

(86) PCT No.: PCT/EP2013/064091
§ 371 (c)(1),
(2) Date: Jan. 2, 2015

(87) PCT Pub. No.: WO2014/006119
PCT Pub. Date: Jan. 9, 2014

(65) Prior Publication Data
US 2015/0144120 A1 May 28, 2015

(30) Foreign Application Priority Data
Jul. 5, 2012 (EP) .................................... 12175050

(51) Int. Cl.
*B23D 61/18* (2006.01)
(52) U.S. Cl.
CPC .................................... *B23D 61/185* (2013.01)
(58) Field of Classification Search
CPC ....... B23D 61/184; B28D 1/08; B28D 5/045
See application file for complete search history.

(56) References Cited

U.S. PATENT DOCUMENTS

| | | | | |
|---|---|---|---|---|
| 6,070,570 A | * | 6/2000 | Ueoka | B23D 61/185 125/16.02 |
| 6,194,068 B1 | * | 2/2001 | Ohashi | B23D 61/185 427/201 |
| 8,291,895 B2 | * | 10/2012 | Sudarshan | B05C 19/04 125/21 |
| 2005/0087270 A1 | | 4/2005 | Nagao et al. | |
| 2005/0155595 A1 | * | 7/2005 | Kondo | B23D 57/0053 125/21 |
| 2012/0017741 A1 | * | 1/2012 | Lange | B23D 61/185 83/651.1 |
| 2012/0037140 A1 | * | 2/2012 | Campos | B23D 61/185 125/12 |
| 2014/0165804 A1 | * | 6/2014 | Dumm | B23D 61/185 83/16 |

FOREIGN PATENT DOCUMENTS

| | | |
|---|---|---|
| EP | 2 277 660 A1 | 1/2011 |
| EP | 2 390 055 A1 | 11/2011 |
| EP | 2 464 485 | 6/2012 |
| EP | 2 572 818 A1 | 3/2013 |
| JP | 2007-307650 A | 11/2007 |
| WO | WO 2010/092151 A1 | 8/2010 |

(Continued)

*Primary Examiner* — Dung Van Nguyen
(74) *Attorney, Agent, or Firm* — Foley & Lardner LLP (57) ABSTRACT

The invention a fixed abrasive sawing wire comprising diamond particles held in a metallic retention layer on a steel wire. The steel wire has a diameter less than 300 μm. More than half of the diamond particles (102, 102', 104, 104', 104'', 104''') have a cubo-octahedral morphology as obtained in the diamond synthesis by high pressure at high temperature. 95% of the diamond particles have a size of 80 pm or less. The diamond particles predominantly show low elongation below or equal to 0.2 and are not obtained by crushing larger diamonds.

12 Claims, 4 Drawing Sheets

(56) References Cited

FOREIGN PATENT DOCUMENTS

| WO | WO 2010/125083 A1 | 11/2010 |
| WO | WO 2011/014884 A1 | 2/2011 |
| WO | WO 2011/020105 A2 | 2/2011 |
| WO | WO 2012/055712 A1 | 5/2012 |

\* cited by examiner

FIXED ABRASIVE SAWING WIRE WITH CUBO-OCTAHEDRAL DIAMOND PARTICLES

TECHNICAL FIELD

The invention relates to a fixed abrasive sawing wire suitable for sawing hard materials such as silicon or extremely hard materials such as sapphire. Sapphire wafers are used as substrates for light emitting diodes, as watch windows, as optical components and in many other applications.

BACKGROUND ART

Sawing sapphire (alpha alumina, $\alpha$-$Al_2O_3$) into wafers is a challenge as the material has a hardness of 9 on Mohs scale (diamond having the highest hardness of 10 on Mohs scale). Currently the technology of using diamond loaded dicing blades is being overtaken by the use of multiwire saws for reasons of economy. In a multiwire saw, a single sawing wire is led over grooved capstans thereby forming a web of closely spaced apart wire lengths. By reciprocating the wire in a back and forth movement and pushing the sapphire boule into the web under supply of a coolant, the sapphire boule gets cut into wafers. Instrumental in the whole process is of course the sawing wire that is almost exclusively of the fixed abrasive sawing wire type.

In a 'fixed abrasive sawing wire' tiny cutting diamonds are firmly attached to the surface of a fine wire of high strength. The finer the wire, the lower the kerf loss will be which is an advantage as then in one cutting cycle more wafers can be obtained from the same boule in an equal time span. Still the cutting speed is low: about 3 to 4 hours is needed to saw a 2 inch (50.8 mm) boule but this is outweighed by the parallel cutting of many wafers in one cycle. In addition the wire wears in the process and on average about three to eight meter of wire is needed to cut a single wafer. As only diamond abrasive particles are used, the wire tends to be expensive.

Currently fixed abrasive sawing wires are made according a number of processes resulting in strongly differing products:

A. The abrasive particles can be held in a resin bonded to the substrate wire. As the resin tends to wear rather quickly thereby losing the abrasive particles, the wear of the wire is rather high.

B. EP 2390055 describes a fixed abrasive sawing wire wherein abrasive particles are fixed in a metal layer made of a low melting point solder based on zinc or tin. The abrasive grains are made to adhere well to the solder by mediation of a high melting point metal that is present around the abrasive particle. The disclosure particularly mentions that crushed diamonds are preferred as abrasive particles as these tend to have a larger contact surface with the solder.

C. EP 2277660 describes a fixed abrasive sawing wire wherein abrasive particles—diamond and cubic boron nitride are preferred—are encapsuled in a nickel phosphorous coating that is at least partly crystallized. The encapsulated abrasive particles are electrochemically coated on a magnetic linear body such as a steel wire. No information is given on the morphology of the abrasive particles.

D. EP 2464485 discloses an abrasive article including abrasive particles bonded to an elongated body that is used for the cutting of sapphire. Abrasive particles are pressed into a metallic bonding layer further possibly covered by a coating layer. Specific about this wire is that the size distribution of the abrasive grains is non-gaussian and substantially uniform while extending over a wide yet precisely limited range of from about 1 micron to about 100 micron.

In commercial fixed abrasive sawing wire exclusively 'crushed diamonds' are used. These are obtained by fragmenting larger man-made or natural diamonds by crushing (ball mills, shock impacting or other techniques). Man-made diamonds are preferred for their predictable and reproducible properties. They are made from a mixture of graphite and metallic catalysts under extreme pressure and temperature and the processing and starting products allow to tune the resulting diamonds in size, strength, friability and shape. Hence, more friable diamonds are used for crushing. The resulting mix is classified usually by means of sieving but for smaller grit sizes other techniques must be used (air blow separation, sedimentation, elutriation, or other techniques). In this way fine powders can be obtained in an economical way.

In a sawing wire for cutting silicon wafers—for example for solar cells or for the semi-conductor industry—a more friable diamond is preferred as during use new cutting edges then appear i.e. the wire is self-sharpening. Moreover, the irregular shape of the diamond results in a better retention in the matrix.

An extreme embodiment of irregular shaping is demonstrated in WO 2011/014884 A1 wherein a fixed abrasive sawing wire is disclosed having surface modified diamond particles. The surface of the diamonds has been treated in order to obtain a very rough outer surface and is largely aspheric. Although for certain applications it is believed that such surface will result in better retention and self-sharpening, this will not be the case for very hard materials like sapphire.

Indeed, the cutting of extreme hard materials such as sapphire poses other challenges in that the friable diamonds will wear too fast which must be compensated by having more diamond on the surface of the wire and or a faster use of the wire during cutting. Also—due to the hardness of the material—a higher pressure must be exerted in the cut to push the diamonds with sufficient force against the sapphire. This can be achieved by applying higher tensile forces on the wires in the web. Hence, this implies also that thicker wires must be used leading to an associated increased kerf loss.

DISCLOSURE OF INVENTION

It was therefore a goal of the inventors to improve the sawing of sapphire by means of a wire saw. With 'improve' is meant that the amount of wire used and/or the amount of energy used in the process is reduced.

According an aspect of the invention, a fixed abrasive sawing wire is claimed that is particularly useful for cutting sapphire. However, this does not exclude that the wire cannot be used to cut hard and brittle materials that are softer than sapphire such as silicon. As a strength member a steel wire is used. Diamond particles are attached to the surface of the wire by means of a metallic retention layer. The metallic layer serves to hold the diamond particles in situ. Characteristic about the fixed abrasive sawing wire is that at least 95% of the diamond particles have a size below 80 micrometer and that at least 50% of the diamond particles show a cubo-octahedral shape.

A cubo-octahedral shape—for the purpose of this application—is any shape starting from a cube wherein the vertices have been cut away by a plane in the eight {111} directions of the cube represented by their Miller indices. Assuming the square faces of the cube have an edge length 'a' and the (111) plane cuts of a cube vertex at a distance 'b' along the edge from that cut-off vertex a ratio 'b/a' can be defined (see Table I). 'b' need not be the same for every vertex of a single particle. Ultimately the shape is between and includes the shapes of a cube and an octahedron. The spectrum of shapes can be summarised as follows:

TABLE I

| Graph | Edges | Faces | Vertices | Cut-off ratio |
|---|---|---|---|---|
|  | 12 | 6 | 8 | b/a = 0<br>Cube |
|  | 36 | 14 | 24 | 0 < b/a < ½ |
|  | 24 | 14 | 12 | b/a = ½ |
|  | 36 | 14 | 24 | b/a = ¾ |
|  | 12 | 8 | 6 | b/a = 1<br>octahedral |

Note that the 'b' length must not be equal for every vertex. The represented shapes are only discrete transitions in an otherwise continuous spectrum of forms. They represent ideal forms and hence in practise some deviation will occur and is allowed without deviating from the scope of the claims. It must also be kept in mind that there is no restriction that the faces must be regular polygons. For example it may well be that a hexagonal face is not a regular hexagon: some deviation in length of edges is allowable, as long as the general shape shows a hexagon. Furthermore, in order to determine whether a shape is of cubo-octahedral type only the number of faces should be counted—14 being the most prominent number as a cube or octahedral shape is extremely rare—taking abstraction of the shape at the edges.

Alternatively a cubo-octahedron is always a convex body. Hence, particles that show cavities or other surface indentations are not convex and cannot be cubo-octahedrals.

For the purpose of this application it must be understood that the terminology 'cubo-octahedral' should not be equated to 'monocrystalline'. While a cubo-octahedral diamond grain is monocrystalline, not every monocrystalline grain is cubo-octahedral. Crushed diamond particles for example will have the typical long range crystallographic ordering of a single crystal i.e. are monocrystalline but obviously they are not cubo-octahedral in shape.

Further, it must also be kept in mind that any representation of the shape on paper of a diamond particle is necessarily only a two dimensional projection of an otherwise three dimensional solid shape. Hence no limitation can be drawn from the figures as they only help to explain the invention.

Diamonds with a cubo-octahedral shape are stronger then the irregularly shaped and rough surfaced crushed diamonds. As a result they will fracture less for the same intrinsic strength. Such diamonds in small size are—at present—expensive and therefore not considered for the manufacturing of a fixed abrasive sawing wire. Also there is a prejudice in the field that for producing fixed abrasive sawing wire crushed diamond particles are preferred. The inventors have a different opinion.

At least 50% of all diamonds as extracted from the sawing wire must show a cubo-octahedral shape. More preferred is if 60% or 70% or even 80% to 90% of all diamonds extracted from the sawing wire show a cubo-octahedral shape. Some margin is given for diamonds that may not be completely cubo-octahedral or are broken or twinned during synthesis or further processing. Ideally 100% of the diamonds show a cubo-octahedral shape. If more diamonds show a cubo-octahedral shape, the useable life of the fixed abrasive sawing wire increases.

Furthermore, at least 95% of the diamonds must have a size that is smaller than 80 micrometer. More preferred is that 95% of the diamonds have a size below 60 micrometer or even below 50 micrometer. At present few sources for cubo-octahedral diamonds of size below 10 micron are known. Possibly a mixture of several sizes of cubo-octahedral diamonds can be present provided they meet the requirement that the total of the distribution is such that 95% of all diamonds have a size smaller than 80 micro meter.

The smaller the size of the particles is the lower the overall diameter of the wire can be. As a rule of thumb, the median size of the particle should be less than $\frac{1}{4}^{th}$ of the diameter of the steel wire, but larger than $\frac{1}{12}^{th}$ of the diameter of the steel wire.

For the purpose of this application reference will be made to the 'size' of the particles rather than their 'diameter' (as a diameter implies a completely spherical shape). The size of a particle is a linear measure (expressed in micrometer) determined by any measuring method known in the field. It is always somewhere in between the maximum and minimum Feret distance. A Feret distance for a certain direction relative to a 2D projection of a particle is the perpendicular distance between two parallel lines tangent to that projection in that direction. The minimum respectively the maximum Feret distance is then the smallest respectively the largest Feret distance taken over all possible projections of the particle and all directions of the two parallel lines for each projection.

The size of particles is preferably determined by means of laser diffraction, direct microscopy, electrical resistance or photosedimentation. The standard ANSI B74.20-2004 goes into more detail on these methods. For the purpose of this application when reference is made to a particle size, the particle size as determined by the laser diffraction method (or 'Low Angle Laser Light Scattering' as it is also called) is meant. The output of such a procedure is a cumulative particle size distribution with in ordinate the probability 'P' to have a particle with a size smaller than or equal to size '$d_P$' indicated on the corresponding abscissa. The complementary part (100-P) percent being larger sized than this '$d_P$'. Hence the particles according the invention have $d_{95} \leq 80$ μm, or more preferred $d_{95} \leq 60$ μm or even more preferred is that $d_{95} \leq 50$ μm.

Typically the size of micron grit diamond particles is expressed in size ranges rather by sieve numbers according to ANSI B74.20-2004. E.g. the size range of 50-70 μm has 95% of all particles smaller than 70 μm, hence would be a suitable size range according the invention. Informative, but subordinate for the invention, this class has a median size $d_{50}$ of 60.0 (+/−6.0) μm and only 5% of the particles are smaller than 50 μm. There is only a probability of less than 1 in 100 to find a particle larger than 90 μm. Other suitable size ranges are 40 to 60 μm (95% of all particles smaller than 60 μm), 40 to 50 μm, 30 to 40 μm, 25 to 35, 20 to 30, 15 to 25, 10 to 20 μm. This being said: the invention does not exclude the blending of different size ranges as long as the requirement of $d_{95} \leq 80$ μm is met.

The above size ranges—when expressed in a Mesh size classification—corresponds to all diamond particles passing a Mesh 230 sieve or higher (i.e. Mesh numbers 270, 325, 400, 450, 500, 635) according ASTM E11-09, Table 1. A Mesh 230 sieve has a nominal sieve opening of 0.0025 inch or 63.5 μm and a maximum individual opening of 89 μm.

The shape of the cubo-octahedral particles can be described as having a substantially 'blocky' aspect. Shape parameter of particles are defined in the ISO 9276 part 6 standard. For the purposes of this application, the 'Elongation' of a particle is defined as 1-(Width/Length) wherein:
 'Width' is the Feret distance as measured in the direction of the minor axis of the Legendre ellipse of inertia;
 'Length' is the Feret distance as measured in the direction of the major axis of the Legendre ellipse of inertia;

The Legendre ellipse of inertia is an ellipse with its centre at the particle's centroid and with the same geometrical moments up to second order as the original particle projection.

At least 50% of the diamond particles used for the present invention or sampled from an existing fixed abrasive sawing wire have an Elongation below or equal to 0.20. Even more preferred is if 60% or even 70% of the diamond particles have an Elongation below or equal to 0.20.

The Elongation can in practice be determined with an 'Occhio 500 nano' instrument that allows a computerised classification of particles based on image processing.

Diamond particles of the above mentioned shapes are preferably man-made i.e. synthetic and not natural. Natural diamonds are specifically excluded for being too expensive. They are obtained through catalytic conversion of graphite under high pressure and high temperature. Known catalysts are from group $VIII_b$ of the transition elements (like Fe, Ni, Co, Mn . . . ) at pressure in excess of 50 kbar (5 GPa) and temperatures above 1300° C. Whether or not a diamond particle is made through the high temperature high pressure catalytic route can be ascertained through the presence of such catalytic elements by X-ray fluorescence spectroscopy or Inductively Coupled Plasma spectroscopy after ashing the grits. By preference the amount of catalyst is less than 10 000 ppm on the total mass of diamond and catalyst Preferably, between 0.5 to 3.2 grams or 2.5 to 16 carat (ct) of diamond particles is present per kilometer of wire (quantity G). More than 3.2 g/km may lead to unwanted effects during the production of the wire (crushing or twinning, see further) or loading of the wire during use (when the swarf generated clogs the inter-particle space). Over and above it leads to an overly expensive product. Alternatively when less than about 0.5 g/km of wire is present this may lead to an exaggerated pressure per diamond during use and/or an inadequate sawing performance and/or higher wire wear leading to premature fracture.

An alternative way of expressing the amount of diamond particles is in terms of a coverage degree 'F'. The 'coverage degree' is the ratio of the area occupied by the diamond particles to the total circumferential area of the wire. The relation between mass per unit length 'G' (in g/km) and coverage degree 'F' in percent is:

$$G\ (g/km) = 7.33 \cdot 10^{-3} \times d\ (in\ \mu m) \times D\ (in\ \mu m) \times F\ (in\ \%)$$

Wherein 'd' is the median diameter of the diamond particles and 'D' is the diameter of the wire both expressed in micrometer. By preference the coverage degree 'F' is between 0.5 and 50% but more preferred is between 1 and 10%. With a coverage degree of more than 50% chances that a diamond will occupy the place of an already present diamond during production will be about 25 diamonds per 200. This makes the occurrence of twinning and/or crushing during production (see further) likely. Twinning and crushing leads to inferior cutting performance. With a coverage degree of 0.5% this probability becomes less than 2 on a 100 000 diamonds but then the amount of diamond present becomes too low leading to too much pressure per diamond during sawing and/or premature wear or disruption of the particle or wire.

The coverage degree can be determined in a Scanning Electron Microscope in combination with image analysis software by selecting the surface occupied by the diamond particles and relating it over the peripheral surface of the wire.

Depending on the bonding technique envisaged the diamond particles can be substantially free of a metal coating or be coated with a metal. With 'substantially free' is meant that there is no trace of coverage of the diamonds by a metal prior to embedding in the wire. Possible diamond coating metals are strong carbide formers such as titanium, zirconium and silicon. Less carbide forming metals are vanadium, chromium, tungsten, molybdenum and manganese. With these metals a metal carbide layer will form on the diamond such as titanium carbide, zirconium carbide, silicon carbide, tungsten carbide, molybdenum carbide and manganese carbide. Also usable are the elements of the $VIII_b$ group and more in particular iron, cobalt, nickel and palladium. Particularly useful are also nickel phosphorous or nickel boron metalloids. Combinations of the two layers are not excluded: for example a nickel phosphorous coating on a titanium carbide is also considered as a metal coating of the diamond. The purpose of the metal can be twofold: to entrain electrical conductivity to the surface of the diamond and/or to obtain an improved diamond retention by providing a better bond between diamond and retention layer.

The substrate wire is a steel wire. The wire by preference is round and has a diameter between 50 to 300 μm. As mentioned there is a preferred ratio between the diameter of the steel wire and the size of the diamond particles: the median size should be between $\frac{1}{4}^{th}$ to $\frac{1}{12}^{th}$ of the diameter of the steel wire.

Preferably the steel wire is made of plain carbon steel that not only comprises iron and carbon but a lot of other alloy and trace elements, some of which have a profound influence on the properties of the steel in terms of strength, ductility, formability, and corrosion resistance. The following elemental composition is preferred for the steel wire:
 At least 0.70 wt % of carbon, the upper limit being dependent on the other alloying elements forming the wire (see below)

A manganese content between 0.30 to 0.70 wt %. Manganese adds—like carbon—to the strain hardening of the wire and also acts as a deoxidiser in the manufacturing of the steel.

A silicon content between 0.15 to 0.30 wt %. Silicon is used to deoxidise the steel during manufacturing. Like carbon it helps to increase the strain hardening of the steel.

Presence of elements like aluminium, sulphur (below 0.03%), phosphorous (below 0.30%) should be kept to a minimum.

The remainder of the steel is iron and other elements

The presence of chromium (0.005 to 0.30% wt), vanadium (0.005 to 0.30% wt), nickel (0.05-0.30% wt), molybdenum (0.05-0.25% wt) and boron traces may reduce the formation of grain boundary cementite for carbon contents above the eutectoid composition (about 0.80% wt C) and thereby improve the formability of the wire. Such alloying enables carbon contents of 0.90 to 1.20% wt, resulting in tensile strengths that can be higher as 4000 MPa in drawn wires. Such steels are more preferred and are presented in US 2005/0087270.

Alternatively stainless steels containing a minimum of 12% Cr and a substantial amount of nickel can also be used. More preferred stainless steel compositions are austenitic stainless steels as these can easily be drawn to fine diameters. The more preferred compositions are those known in the art as AISI 302 (particularly the 'Heading Quality' HQ), AISI 301, AISI 304 and AISI 314. 'AISI' is the abbreviation of 'American Iron and Steel Institute'.

Fixed abrasive sawing wires according to the invention typically have a tensile strength of above 2000 N/mm$^2$ for diameters smaller than 300 μm, above 2250 N/mm$^2$ for diameters smaller than 150 μm, and above 2500 N/mm$^2$ for diameter smaller than 120 μm. The tensile strength is defined as the breaking load of the fixed abrasive sawing wire divided by its metallic cross sectional area (excluding the area taken up by the abrasive particles). Any supplementary metallic layer is taken into account for the area.

As mentioned different processes are in use for making a fixed abrasive sawing wire that can be applied to produce the fixed abrasive sawing wire according the invention. The preferred methods for the purpose of this invention all make use of a metallic retention layer wherein the diamond particles are held firmly.

In a first preferred embodiment the metallic retention layer comprises a first metal layer covering the steel wire. The diamond particles are pushed, indented, pressed by mechanical means into this first metal layer thereby being already firmly held in this layer. It follows that the layer must be sufficiently thick so that the diamond particles do not penetrate through the layer and touch the steel. Also this first metal layer must be made from a metal that is relatively soft compared to the hard steel wire to prevent crushing of the diamond particles. Particularly preferred metals for this first layer are therefore copper, iron, zinc, tin, aluminium or alloys of such soft metals like brass, bronze, copper-nickel, zinc-aluminium. Such first layer can be applied through electrodeposition, cladding or dipping through a molten metal bath.

In order to fix the abrasive particles further a second metal layer is deposited on top of the first metal layer thereby partially or wholly covering the indented diamonds particles. Advised metals for the second metal layer are nickel, iron, cobalt, molybdenum, tungsten, copper, zinc, tin and alloys thereof. Preferably the second metal layer is deposited by means of electrolytic deposition.

Both diamonds coated with a metal coating prior to embodiment or without any metal coating can be used. In the latter case the second metal layer will not cover the protruding diamond surface as there is no conduction at the surface. In the former case the protruding diamond surface may be covered by the second metal layer depending on the conductivity of the coating applied. Exemplary ways to produce such wire by indentation are described in WO 2010/125083 and in WO 2010/092151.

An alternative way to hold the diamond particles is by means of a metallic retention layer that is electrolytically deposited on the steel wire and wherein the particles are embedded during the electrolytic coating process. Preferably the retention layer comprises a first metal layer covering said steel wire and a second metal layer electrolytically deposited on top of said first metal layer. The diamond particles are electrolytically co-deposited with the second metal layer. Typical metals that can be used for the first layer are iron, aluminium, nickel, chromium, cobalt, molybdenum, tungsten, copper, zinc, tin and alloys thereof such as brass or bronze. Particularly preferred are copper, zinc, cobalt, nickel or aluminium as they have a high electrical conductivity that greatly improves the deposition process.

Preferred metals for the second metal layer are nickel, iron, cobalt, molybdenum, tungsten, copper, zinc, tin and alloys thereof. Most preferred are nickel or nickel alloys such as nickel-cobalt or nickel-tungsten due to their hardness. When adjacent metal layers possibly deposited in sequence are of the same metal they are considered as a single layer.

When diamonds coated with a metal—for example a carbide forming metal or a nickel phosphorous or nickel boron coating—prior to being deposited onto the wire are used, the diamonds can co-deposit with the second layer of the retention layer. Possibly the steel wire is primary coated with a first metal layer of brass, copper, zinc, nickel before the second metal layer is electrodeposited onto to steel wire with co-deposition of the diamond particles. Preferably the second metal layer is further thickened by electrodeposition after co-deposition of the diamond particles on top of the diamonds. An exemplary procedure to co-deposit the diamonds onto the steel wire is for example described in WO 2012/055712.

Alternatively, the diamonds can be free of a metallic coating. Then diamonds are adhered by adsorption onto the steel wire prior to fixation with the metallic retention layer.

In a final preferred embodiment the diamonds are fixed in a low melting point solder that is a mixture of tin, silver, gold and copper. An exemplary method to make a fixed abrasive sawing wire in such process is described in EP 2390055.

BRIEF DESCRIPTION OF FIGURES IN THE DRAWINGS

In the figures like elements are indicated with identical unit and tens digits, while the hundreds refer to the figure number.

MODE(S) FOR CARRYING OUT THE INVENTION

According a first example of the invention, a fixed abrasive sawing wire of the indented type was produced. As a starting material a plain carbon steel wire of intermediate wire diameter 1.30 mm with a carbon content of 0.80 mass % carbon was used. The intermediate wire was coated with a copper coating—the first metal layer—by electrolytic deposition and subsequently drawn to a final equivalent diameter of 175 µm core steel diameter. With equivalent diameter, the diameter of a circle with the same steel area as a perpendicular cross section of the wire is meant. Different amounts of copper thicknesses were thus obtained on the final product as summarised in Table II. Subsequently, different sizes and type of diamond were indented into the copper layer by means of indentation rolls. All diamonds are free of a metal coating. Finally the indented particles were further fixed by means of a nickel layer—the second metal layer—that was electrolytically plated on top of the first metal layer. As the diamond particles were initially not coated, they were only partially covered by the second metal layer. The amount of diamond per km of wire as found back on the non-used wire is noted in column 'G'

TABLE II

| Sample Nr. | Cu-coating thickness (in µm) | Diamond particle size $d_5:d_{50}:d_{95}$ (in µm) | Type of diamond | Ni-coating thickness (in µm) | G (g/km) |
|---|---|---|---|---|---|
| S1 | 10 | 20:25:30 | Crushed, not coated | 2 | 1.89 |
| S2 | 10 | 20:25:30 | Crushed, not coated | 3 | 1.74 |
| S3 | 15 | 30:35:40 | Crushed, not coated | 5 | 1.55 |
| S4 | 15 | 35:40:45 | Cubo-octahedral, not coated | 7 | 1.47 |
| S5 | 15 | 35:40:45 | Cubo-octahedral, not coated | 10 | 1.75 |

Possible suppliers of cubo-octahedral diamonds of small size are Husqvarna, Belgium, Premier Diamond Corporation N.V. (Antwerp, Belgium) or Iljin Korea.

50% the diamond particles of S4 and S5 showed an Elongation of 0.145 or lower. 10% of the particles showed an Elongation below 0.044. In contrast the diamonds of the crushed type of S3 showed that 50% of the diamond particles had an elongation above 0.236. The particles of 51 and S2 showed in more than 50% of the cases an Elongation larger than 0.232.

Figure 1:
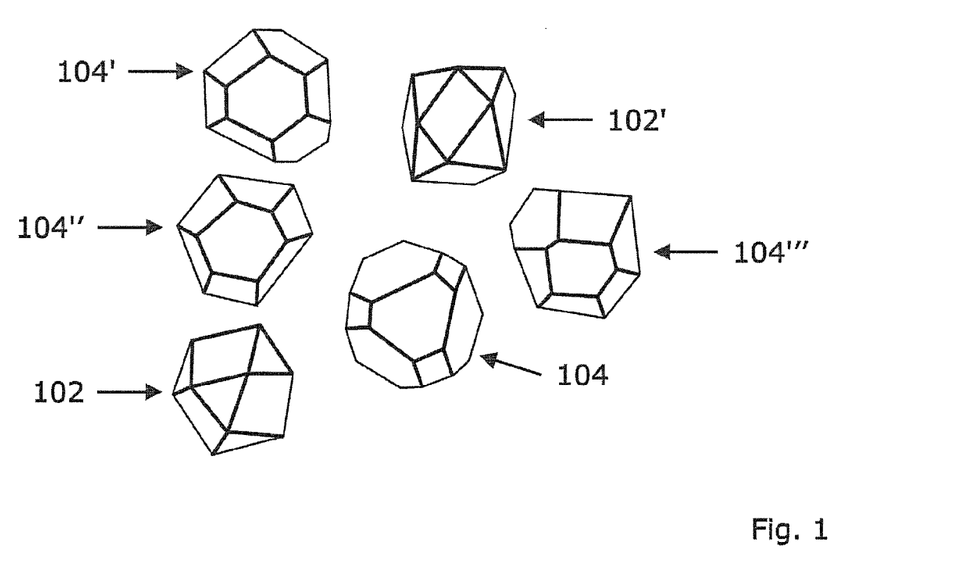
FIG. 1 shows projections of cubo-octahedral type diamonds as they occur in reality.

FIG. 1 shows projections of particles reclaimed from those types of wires of which more than 50% showed a cubo-octahedral shape. The diamond particles all have 14 faces (not including the rounded edges). The particles indicated with 102, 102' have a 'b/a' value of close to 0.5. Particles 104, 104', 104", 104'" have a 'b/a' value close to ¾. These projections only serve to give an impression of how the diamond particles look like, but cannot be used to positively identify the diamonds as being of cubo-octahedral shape (as it are two dimensional projections of a three dimensional body).

Figure 2:
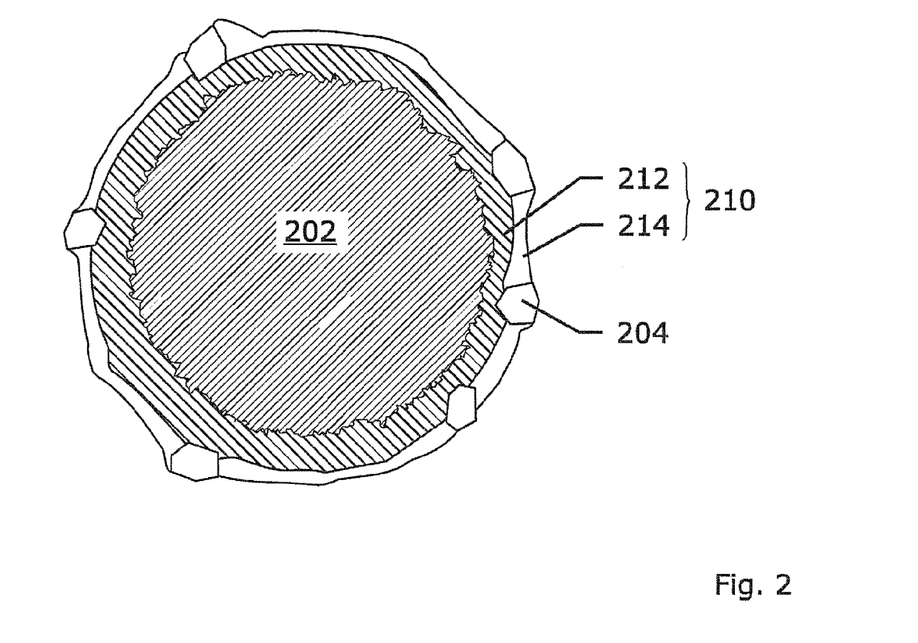
FIG. 2 shows a first preferred embodiment of the fixed abrasive sawing wire according the invention as produced by the diamond indentation method.

FIG. 2 shows how the indented fixed abrasive sawing wire schematically looks in cross section. The steel core wire 202 is at the centre. The metallic retention layer 210 consists of a first metal layer 212 made of copper that covers the steel core wire 202. Note that the interface between the steel core 202 and the copper layer 212 is rough and interlocking. This is due to the drawing from the intermediate wire diameter to the final diameter. Such a rough interface helps to lock the copper layer on the steel. The diamond particles 204 are mechanically pressed into the copper layer by guiding them through indentation rolls. The second metal layer 214 is made of nickel that is electroplated on top of the copper layer and the diamonds. As the diamonds are not coated they show only partial coverage of nickel.

The wires were tested on a single wire saw of type RTS-480 obtained from DWT with a rocking yoke. The wire tension was held at 22 N and the yoke was lowered at 420 µm per minute. A PEG based coolant was used. The sapphire 2 inch (50.8 mm diameter) ingot was mounted on a holder equipped with a load sensor measuring the vertical load exerted on the ingot while sawing. The integral of (forcex time) was used as a 'sawing effort' measure. The lower this 'sawing effort' the less force is needed to cut the sapphire crystal through (as the total sawing time is standardised by the sawing protocol).

Figure 5:
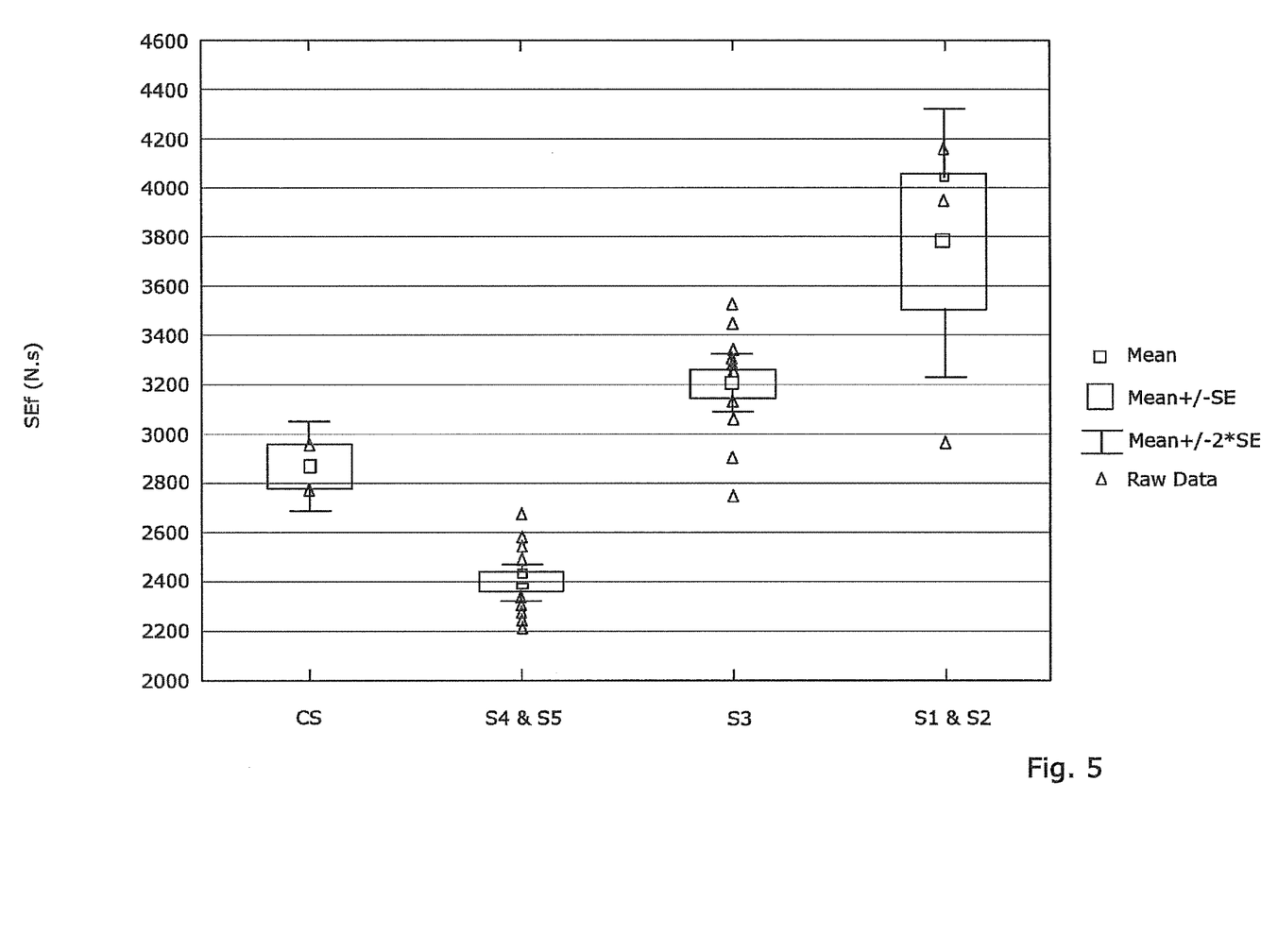
FIG. 5 shows comparative sawing results of different fixed abrasive sawing wires.

The results of the different sawing wires are reproduced in FIG. 5. There for the different samples the 'sawing effort' is shown (in units of N·s). The 'Comparative sample CS' is an electrolytically deposited type having a core diameter of 160 µm and diamond particles with size 30-40 µm of the crushed type. The other results are as per the 'Sample number' of Table II. Each triangle represents a single first cut of every wire. The square represents the mean value of the individual data, the rectangular box the mean plus minus one standard deviation, and the whiskers the mean value plus minus two standard deviations.

The results for wires using cubo-octahedral diamonds clearly show a decreased sawing effort at first cut compared to all other samples using crushed diamonds.

Figure 6:
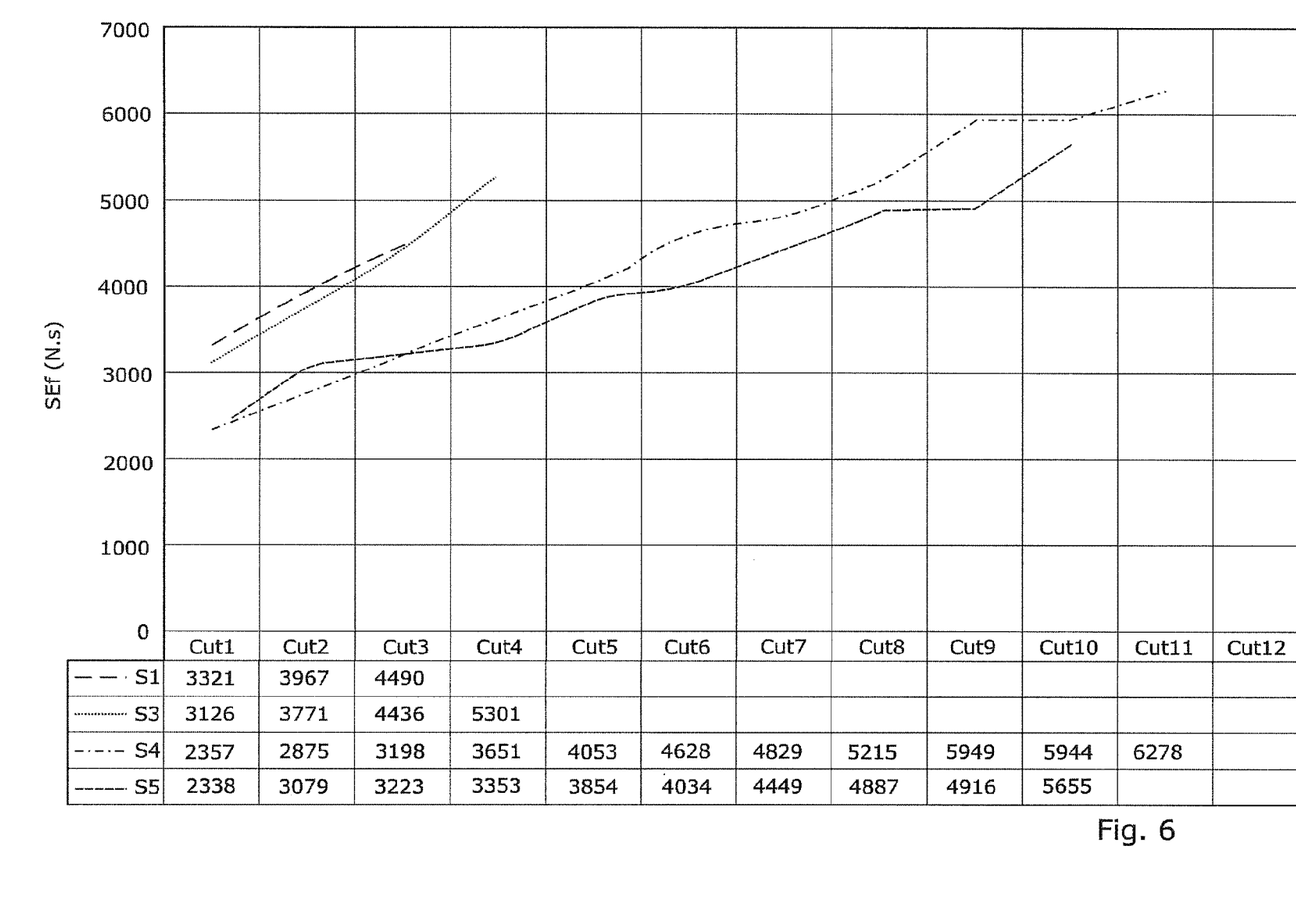
FIG. 6 shows end-of-life testing of the fixed abrasive sawing wires.

Also with the cubo-octahedral diamonds it was possible to reuse the fixed abrasive sawing wire more than with crushed diamond types. The mechanically indented, crushed diamond type wire (samples 1 to 3) could only be used a limited number of times (3 to 4 times). The mechanically indented sawing wire with cubo-octahedral diamonds could be used 10 to 11 times before the 'sawing effort' became too large. This is illustrated in FIG. 6 that displays the sawing effort needed per use cycle for the samples mentioned. This clearly diminishes the amount of wire needed to cut a single sapphire wafer.

Figure 3:
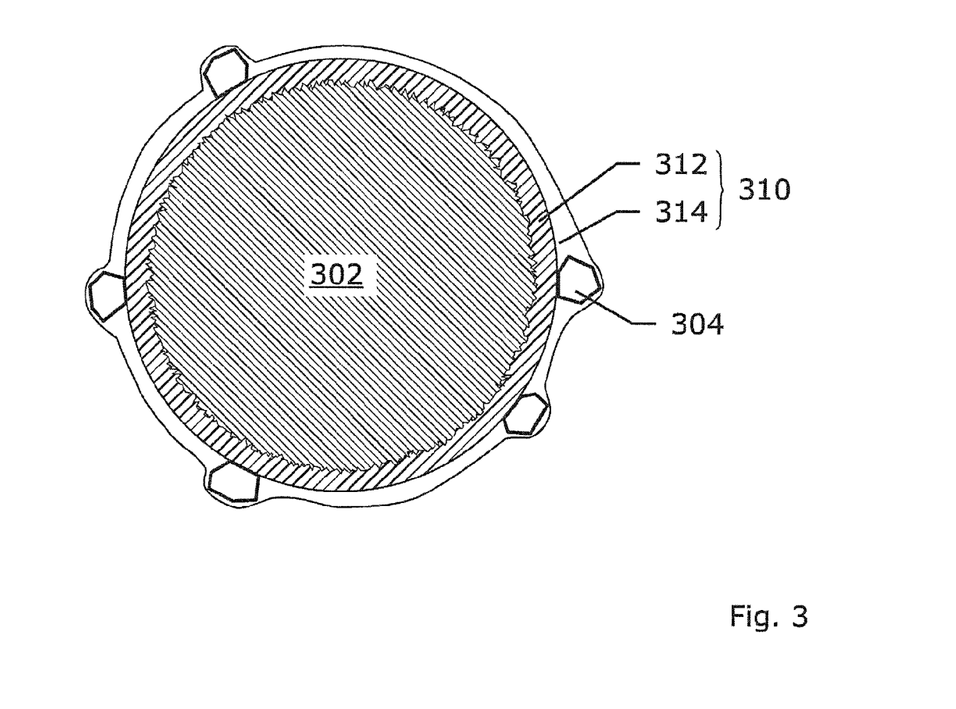
FIG. 3 depicts a second preferred embodiment of the inventive fixed abrasive sawing wire wherein diamond particles are electrolytically co-deposited with the second metal layer.

A further preferred embodiment is shown in FIG. 3. A steel core wire 302 is electrolytically coated with a copper layer 312 prior to final drawing. The copper layer—the first metal layer of the retention layer—has a thickness on the final product of about 10 µm on a steel core wire of equivalent diameter 175 µm. On top of that cubo-octahedral diamonds 304 of size $d_{50}$ 40 µm are co-deposited with a nickel layer 314 thereby forming the metallic retention layer 310 together with first metal layer 312. The cubo-octahedral diamond particles are coated with nickel-phosphorous prior to the co-deposition in an amount of 10% or more of mass of nickel-phosphorous over mass of diamond. This is indicated in the drawing by the thicker lining of the diamonds. As a result the diamond particles are completely covered during deposition. The nickel coating—the second metal layer 314 of the retention layer—has a thickness of 15 µm.

Electrolytic coating is performed in a run-through installation comprising a series of 4 run-over trays. Each of the trays has an anode the current of which can be individually controlled. The coated substrate wire is contacted through a contact wheel at negative potential relative to the anode. The first tray contains a mixture of the nickel coated diamonds and electrolyte over the immersion length of 70 cm. The electrolyte that flows through tray I has the following composition, acidity and temperature:

| Nickelsulfamate electrolyte | Amount (unit) |
|---|---|
| Ni sulfamate (Ni(SO$_3$NH$_2$)$_2$•4H$_2$O) | 440 g/l |
| NiCl$_2$•6H$_2$O | 20 g/l |
| H$_3$BO$_3$ | 30-40 g/l |
| pH | 3.2-3.80 |
| Temperature | 45° C. |

The three following trays are of identical make. They serve to 'thicken-up' the nickel binder layer up to a total thickness of 15 μm of nickel and do not contain abrasive particles. The first bath was held at a current density of 15 A/dm$^2$. The current density in the other baths was held at 20 A/dm$^2$ in the last tray.

Figure 4:
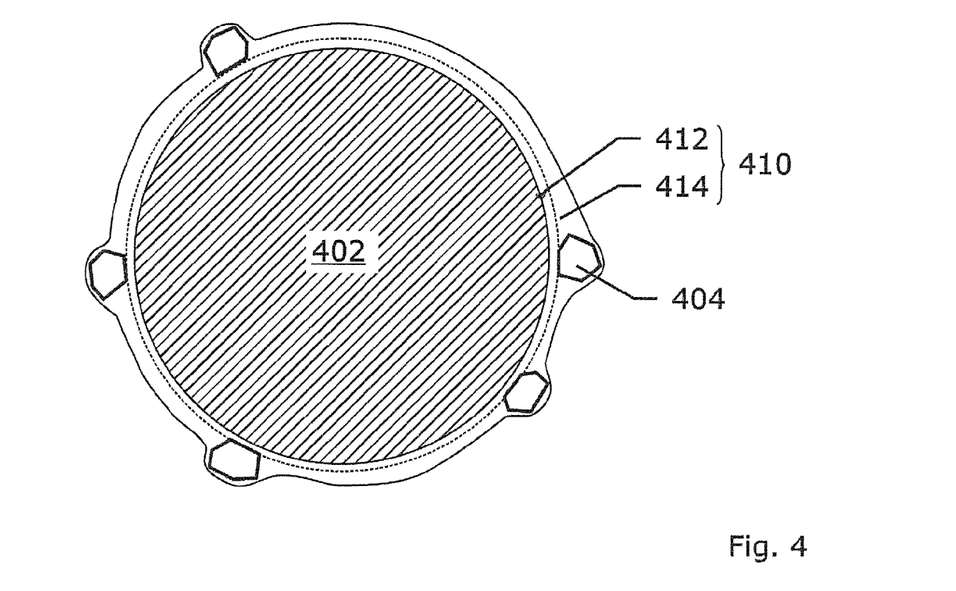
FIG. 4 shows a third preferred embodiment of the inventive fixed abrasive sawing wire wherein a thin first layer is first electrolytically deposited on which diamond particles are electrolytically co-deposited with the second metal layer.

Another preferred embodiment is shown in FIG. 4. A steel core wire 402 is coated with a very thin brass layer 412 with an average thickness of 0.20 μm. The brass has a composition of 67 wt % Cu and 33 wt % Zn forming the first metal layer. On the coated steel wire a nickel coating of a thickness of 1 μm is deposited. Diamond particles 404 are co-deposited in the nickel layer 414. The second metal layer of nickel 414 has a total thickness of 5 μm. The diamond particles are cubo-octahedral and are coated with nickel phosphorous prior to co-deposition. Such a pre-coating is discernible in a Scanning Electron Microscope. The nickel pre-coating has a mass of 16% of the mass of the diamond particles.

The invention claimed is:

1. A fixed abrasive sawing wire suitable for sawing sapphire comprising a steel wire and diamond particles held in a metallic retention layer, characterised in that at least 95% of the diamond particles have a size below 80 micrometer and at least 50% of the diamond particles show a cubo-octahedral shape.

2. The fixed abrasive sawing wire according to claim 1, wherein at least 50% of said diamond particles have an Elongation that is smaller or equal to 0.2.

3. The fixed abrasive sawing wire according to claim 1, wherein said diamond particles are synthetic high pressure, high temperature diamonds.

4. The fixed abrasive sawing wire according to claim 3, wherein said steel wire has a diameter between 50 to 300 μm.

5. The fixed abrasive sawing wire according to claim 1, wherein between 0.5 to 3.2 grams of diamond particles are present per kilometer of wire.

6. The fixed abrasive sawing wire according to claim 1, wherein the surface of said diamond particles is substantially free of a metal coating prior to embedding into said abrasive sawing wire.

7. The fixed abrasive sawing wire according to claim 6, wherein said metallic retention layer comprises a first metal layer covering said steel wire and a second metal layer on top of said first metal layer, wherein said diamond particles are mechanically indented into said first metal layer and said second metal layer partially or wholly covers said indented diamond particles.

8. The fixed abrasive sawing wire according to claim 7, wherein said first metal layer is made of one out of the group comprising copper, iron, zinc, tin, aluminium, brass, bronze, copper-nickel, zinc-aluminium, nickel and said second metal layer is made of one out of the group comprising nickel, iron, cobalt, molybdenum, tungsten, copper, zinc, tin and alloys thereof.

9. The fixed abrasive sawing wire according to claim 1, wherein said diamond particles are coated with a coating out of the group comprising titanium, titanium carbide, zirconium, zirconium carbide, silicon, silicon carbide vanadium, vanadium carbide, chromium, chromium carbide, tungsten, tungsten carbide, molybdenum, molybdenum carbide, manganese, manganese carbide, iron, iron carbide, cobalt, cobalt carbide, nickel, palladium, nickel phosphorous, nickel boron or a combination thereof.

10. The fixed abrasive sawing wire according to claim 9, wherein said metallic retention layer comprises a first metal layer covering said steel wire and a second metal layer deposited on top of said first metal layer and wherein said diamond particles are electrolytically co-deposited with said second metal layer.

11. The fixed abrasive sawing wire according to claim 10, wherein said first metal layer, is made of one out of the group comprising copper, iron, zinc, tin, aluminium, brass, bronze, copper-nickel, zinc-aluminium, nickel and said second metal layer is made of one out of the group comprising nickel, iron, cobalt, molybdenum, tungsten, copper, zinc, tin and alloys thereof.

12. The fixed abrasive sawing wire according to claim 1, wherein said metallic retention layer is a soldered layer of a low melting point solder comprising a mixture of tin, silver, gold and copper.

* * * * *